United States Patent
Zay et al.

(10) Patent No.: US 9,645,729 B2
(45) Date of Patent: May 9, 2017

(54) PRECISE OBJECT SELECTION IN TOUCH SENSING SYSTEMS

(71) Applicant: Texas Instruments Incorporated, Dallas, TX (US)

(72) Inventors: Daniel James Zay, Wylie, TX (US); Michel G. Stella, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 85 days.

(21) Appl. No.: 14/057,503

(22) Filed: Oct. 18, 2013

(65) Prior Publication Data

US 2014/0111486 A1  Apr. 24, 2014

Related U.S. Application Data

(60) Provisional application No. 61/715,619, filed on Oct. 18, 2012.

(51) Int. Cl.
*G06F 3/0488* (2013.01)

(52) U.S. Cl.
CPC ................... *G06F 3/0488* (2013.01)

(58) Field of Classification Search
USPC ......................................... 715/862
See application file for complete search history.

(56) References Cited

U.S. PATENT DOCUMENTS

| | | | | |
|---|---|---|---|---|
| 4,914,522 | A * | 4/1990 | Duffield et al. | 358/296 |
| 4,998,010 | A * | 3/1991 | Chandler et al. | 235/494 |
| 2001/0033690 | A1* | 10/2001 | Berche et al. | 382/192 |
| 2011/0083104 | A1* | 4/2011 | Minton | 715/815 |
| 2012/0069027 | A1* | 3/2012 | Yamazaki | G06F 3/018 |
| | | | | 345/472.3 |

OTHER PUBLICATIONS

Jeff Mccalla, "TI-Nspire App for iPad for Dummies", John Wiley & Sons, Inc., Hoboken, NJ, 2013, pp. 1-19.
Daniel James Zay, "Method, System and Computer Program Product for Operating a Touchscreen", TI-72513, U.S. Appl. No. 13/940,502, filed Jul. 12, 2013, pp. 1-28.

* cited by examiner

*Primary Examiner* — Nicholas Lee
*Assistant Examiner* — Duane N Taylor, Jr.
(74) *Attorney, Agent, or Firm* — Rose Alyssa Keagy; Charles A. Brill; Frank D. Cimino

(57) ABSTRACT

A method for operating a user interface on a system in which objects are displayed on a touch sensitive display screen. A touch coordinate is received from the touch sensitive display screen indicative of a touch location on the display screen. A search area surrounding the touch coordinate is searched for an object. The search area has an initial minimum size. If an object is found within the initial minimum search area it is identified. If no object is found, then the size of the search area is incrementally increased and searched until a final maximum size is reached. If no object is found, then the search is terminated.

18 Claims, 5 Drawing Sheets

PRECISE OBJECT SELECTION IN TOUCH SENSING SYSTEMS

CLAIM OF PRIORITY UNDER 35 U.S.C. 119(e)

The present application claims priority to and incorporates by reference U.S. Provisional Application No. 61/715,619, filed Oct. 18, 2012, entitled "Precise Object Selection for Touch Sensing Systems."

FIELD OF THE INVENTION

This invention generally relates to computers and devices that utilize touch screen user interfaces.

BACKGROUND OF THE INVENTION

A touch screen is an electronic visual display that a user may control through simple or multi-touch gestures by touching the screen with one or more fingers. Some touch screens can also detect objects such as a stylus or ordinary or specially coated gloves. The user can use the touch screen to react to what is displayed and to control how it is displayed, for example, by selecting various objects that are displayed on the screen.

The touch screen enables the user to interact directly with what is displayed, rather than using a mouse, touchpad, or any other intermediate device, other than a stylus, which is optional for most modern touch screens.

Touch screens are common in devices such as game consoles, all-in-one computers, tablet computers, and smart phones. They can also be attached to computers or, as terminals, to networks. They also play a prominent role in the design of digital appliances such as personal digital assistants (PDAs), satellite navigation devices, mobile phones, and video games.

The popularity of smart phones, tablets, and many other types of information appliances is driving the demand and acceptance of common touch screens for portable and functional electronics. Touch screens are popular in the medical field and in heavy industry, as well as in kiosks such as museum displays or room automation, where keyboard and mouse systems do not allow a suitably intuitive, rapid, or accurate interaction by the user with the display's content.

Various technologies have been used for touch screens, including: resistive layers separated by a space, surface acoustic waves, various forms of capacitance coupling, infrared emitters and detectors, optical imaging, acoustic pulse detection, etc.

SUMMARY

A method for operating a user interface on a system in which objects are displayed on a touch sensitive display screen. A touch coordinate is received from the touch sensitive display screen indicative of a touch location on the display screen. A search area surrounding the touch coordinate is searched for an object. The search area has an initial minimum size. If an object is found within the initial minimum search area it is identified. If no object is found, then the size of the search area is incrementally increased and searched until a final maximum size is reached. If no object is found, then the search is terminated.

BRIEF DESCRIPTION OF THE DRAWINGS

Particular embodiments in accordance with the invention will now be described, by way of example only, and with reference to the accompanying drawings.

Figure 1:
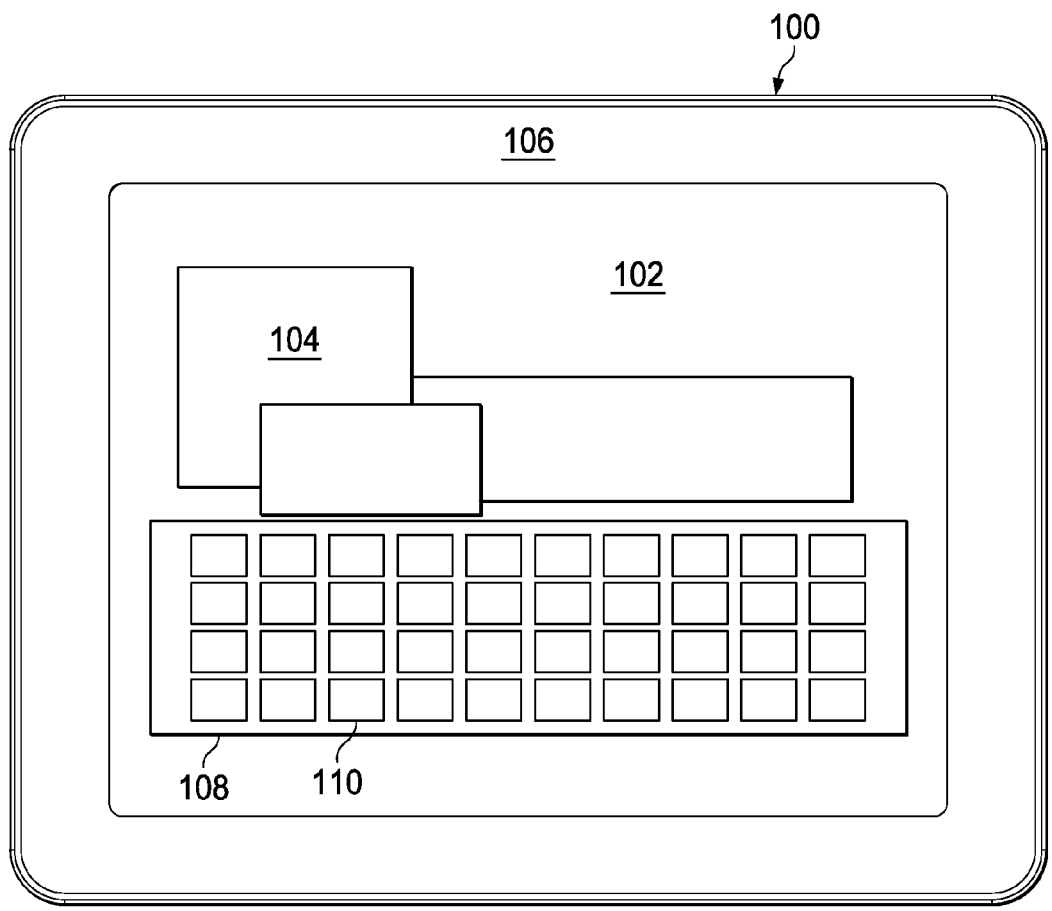
FIG. 1 is an illustration of a tablet computer that supports precise object selection via its touch screen.

Other features of the present embodiments will be apparent from the accompanying drawings and from the detailed description that follows.

DETAILED DESCRIPTION OF EMBODIMENTS OF THE INVENTION

Specific embodiments of the invention will now be described in detail with reference to the accompanying figures. Like elements in the various figures are denoted by like reference numerals for consistency.

For illustrative purposes, embodiments may be described herein with reference to the TI-Nspire™ handheld graphing calculators and the TI-Nspire™ software available from Texas Instruments. One of ordinary skill in the art will appreciate that embodiments are not limited to the TI-Nspire™ calculator and TI-Nspire™ software.

A handheld calculator such as the TI-Nspire™ is capable of generating and operating on one or more documents. In the TI-Nspire™ environment, a document may include one or multiple problems. Each problem may contain multiple pages. Further, each page may be divided into multiple work areas and each work area may contain any of the TI-Nspire™ applications, e.g., Calculator, Graph, Geometry, Lists & Spreadsheet, Data & Statistics, and Notes. An application may be added to a document, for example, by selecting a corresponding application icon in a menu. The Notes application provides functionality for, among other things, adding and formatting text in a document and the insertion of mathematical expressions. This latter functionality is referred to as a math box or math expression box.

The TI-Nspire™ software executes on a computer system and enables users to perform the same functions on a computer system that can be performed on a TI-Nspire™ calculator, i.e., the software emulates the calculator operation. Documents generated using the TI-Nspire™ software can be used on a TI-Nspire™ calculator and vice versa. Student and teacher versions of the TI-Nspire™ software are described in "TI-nspire™ Student Software Guidebook", Texas Instruments Incorporated, 2006-2011, and "TI-nspire™ Teacher Software Guidebook", Texas Instruments Incorporated, 2006-2011. Use of the TI-Nspire software on an iPAD® is described in "Using the TI-Nspire App for iPad for Dummies", 2013, which is incorporated by reference herein.

In order for users to be able to easily manipulate objects on touch platforms a large touch zone may be needed, typically the size of the average finger tip. This large size is needed because the user does not know exactly where their touch gesture will be registered. When objects are in close proximity, however, this large touch zone may result in an ambiguous situation as more than one object may be within the large touch zone. A smaller touch zone can be used; however, this may make it more difficult for a user to manipulate objects since, as previously mentioned, the user does not know exactly where their touch gestures occur. In applications such as math problems, graphing, etc, objects are often displayed on the screen in close proximity.

To solve this problem, multiple touch zone sizes may be used. Specifically, a small touch zone may be used first, and if an object is identified to be in that touch zone then that object is the one selected by the touch gesture. If no object is found in that touch zone then a slightly larger touch zone may be used and again, if an object is identified to be in that touch zone then that object is the one selected by the touch gesture. This process of using increasingly larger touch zone sizes may continue until either an object is found within the current touch zone or the maximum touch zone size is reached and an object is not found.

This approach allows a user to manipulate a single object when multiple objects are in close proximity and still provides for the large touch zone that is needed on touch platforms when ambiguous touch situations are not present.

FIG. 1 shows an example tablet computer 100 that includes one or more applications that support precise object selection via touch sensitive display 102. As shown in FIG. 1, tablet computer 100 includes a graphical display 102 that may be used to display, among other things, information input to applications executing on the tablet computer 100 and various outputs of the applications. For example, each application may use one or more windows 104 for displaying input and output information, as is well known in computer technology. The graphical display 102 may be, for example, an LCD display. One or more control buttons (not shown) may be provided in some embodiments, such as a power button, volume control buttons, etc.

Tablet computer 100 may not have a dedicated keyboard; instead, one or more applications may provide a virtual, or a "soft keyboard" as illustrated by application window 108 that includes a set of keys 110. Display 102 includes touch detection circuitry that allows a user to interact with the display 102 by translating the motion and position of the user's fingers on the display 102 to provide functionality similar to using an external pointing device, such as a mouse, and a keyboard. A user may use the touch sensitive display 102 to perform operations similar to using a pointing device on a computer system, e.g., scrolling the display 102 content, pointer positioning, selecting, highlighting, etc. The general operation of a touch sensitive display screen is well known and need not be described in further detail herein. For example, in some embodiments, a detection circuitry may be located in a peripheral region 106 around the touch sensitive screen. In other embodiments, transparent circuitry may be formed on the face of the screen that detects the presence and location of a finger or pointing instrument that is placed near or in contact with the surface of the screen, etc. Embodiments of the invention that may be used with many types of currently known or later developed touch sensitive screens.

Figure 2:
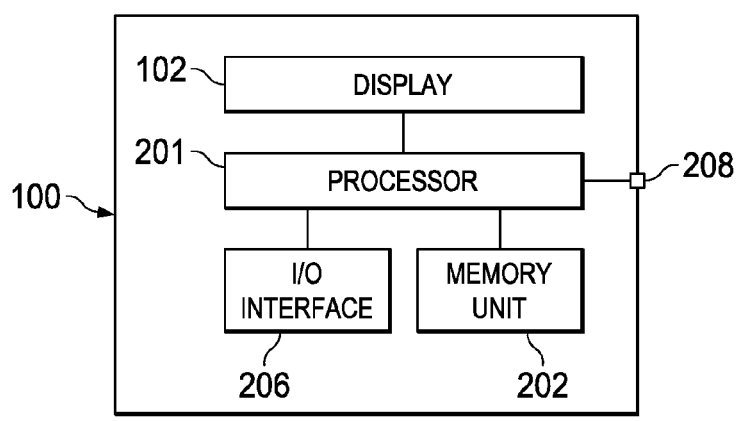
FIG. 2 is a block diagram of the tablet computer of FIG. 1.

FIG. 2 is a simplified block diagram of tablet computer 100. Tablet computer 100 includes a processor 201 coupled to a memory unit 202, which may include one or both of read-only memory (ROM) and random-access memory (RAM). In some embodiments, the ROM stores software programs implementing functionality described herein and the RAM stores intermediate data and operating results.

Touch sensitive display 102 includes control and interface circuitry and is controllably coupled to processor 201 so that touch location input data may be provided to processor 201. An input/output port 208 may provide connectivity to external devices. Input/output port 208 may be a bi-directional connection such as a mini-A USB port, for example. Also included in the tablet computer 100 may be an I/O interface 206. The I/O interface 206 provides an interface to couple input devices such as power control and volume control buttons, for example, to processor 201. In some embodiments, the tablet computer 100 may also include an integrated wireless interface (not shown) or a port for connecting an external wireless interface (not shown).

Figure 3:
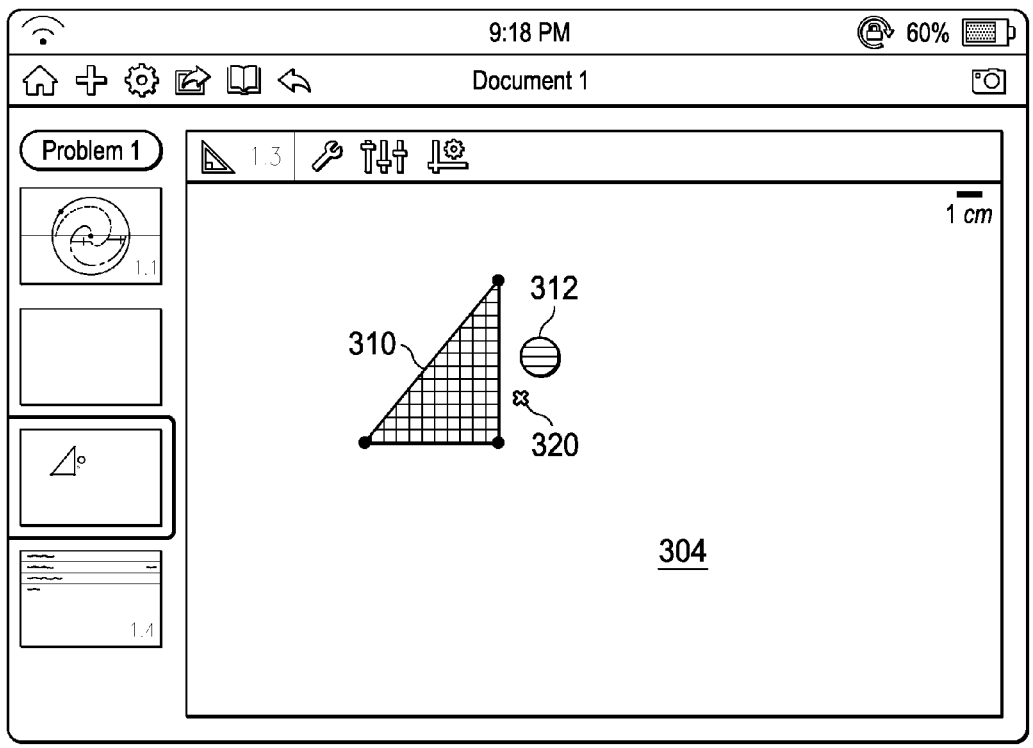
FIG. 3 an example of an application window 304 that is displaying various objects.

FIG. 3 illustrates an example of an application window 304 on tablet computer 100 that is displaying various objects 310, 312, for example. Typically, an application window may be displaying a large number of objects, but in this example only two are illustrated for clarity. This example is for a calculator application that is included in the TI-Nspire application; however, other embodiments may be used in other types of applications that require selection of objects that are displayed on a user interface screen.

When the touch sensitive screen detection hardware 106 (referring to FIG. 1) detects a touch gesture, it provides an x-y touch coordinate of the detected touch gesture to a currently executing software application program. Object selection software may then search for an object that is in proximity to the touch coordinate. In this example, location 320 represents an example location that is provided by the detection hardware to the object selection software.

Figure 4:
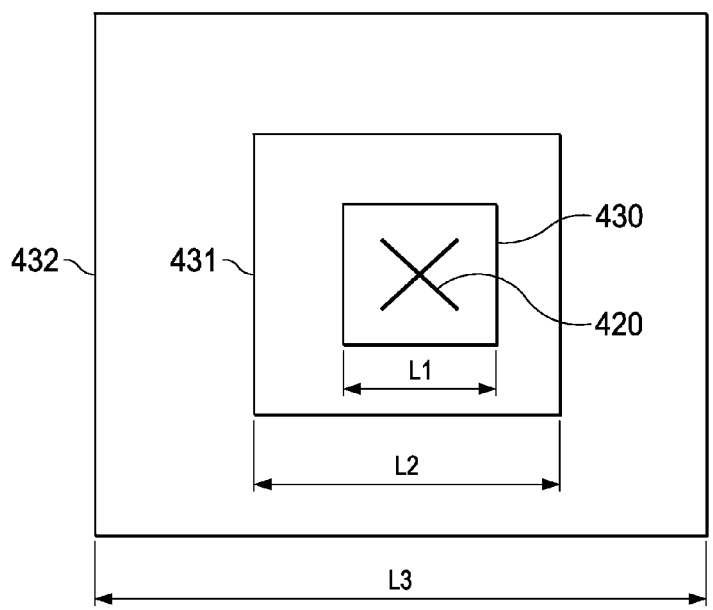
FIG. 4 illustrates various size search areas that may be used by the object selection software in FIG. 3.

FIG. 4 illustrates various size search areas 430-432 that may be used by the object selection software in FIG. 3. As described briefly above, when a gesture interaction occurs at a specific screen location, such as location 420, the object selection application software may iterate through a set of touch zone search areas 430-432 with increasing size to determine if an object coincides with one of the search areas. Each touch zone search area is centered at the gesture interaction location indicated by the touch coordinates. If an object does in fact coincide with a touch zone search area, then the gesture interaction is applied to the identified object. If the object selection software does not find an object that coincides with the current touch zone search area, then the next larger size rectangle is used. If all touch zone search area sizes have been tried and none of the objects were found to coincide with any of the rectangles, then the gesture is ignored.

In this example, the search areas are square; however, in other embodiments the search area may be rectangular, circular, oval, etc, for example. In this example, the smallest square search area 430 has a length L1 on each side that is $\frac{1}{12}$ of an inch, the length of each side of search area 431 is twice as large with a length of $\frac{1}{6}$ inch which quadruples the area, and the length each side of search area 432 is twice as large as the length of each side of search area 431 with a side length L3 that is $\frac{1}{3}$ inch.

Other embodiments may use different initial and maximum search area sizes than illustrated herein. Other embodiments may use more than three iterations of the search area size. In this example, each search is four times as large as the prior search area; other embodiments may use different size ratios between each increasing larger search area, for example. In this example, the touch coordinate is considered to be in the center of the search areas. In other embodiments, the touch coordinate may be offset from the center, for example.

In FIGS. 5-8, the touch zone search area is indicated by a square with the center of the square indicating the gesture interaction location coordinate provided by the touch detection hardware.

Figure 5:
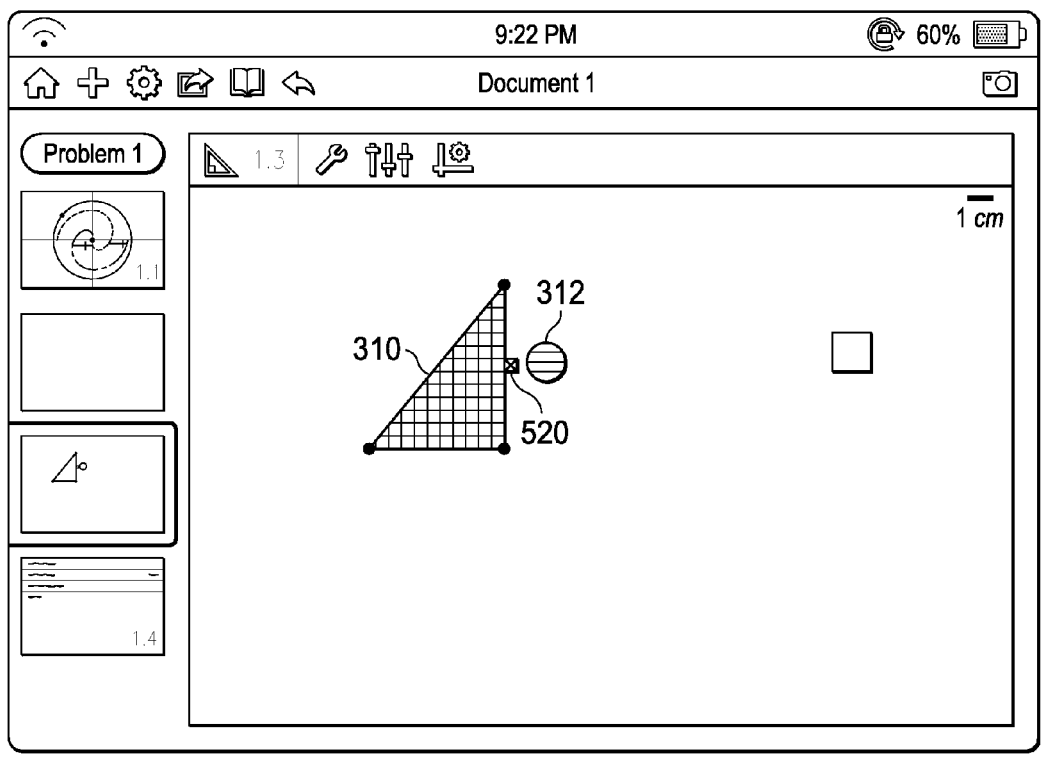
FIGS. 5-8 illustrate various search scenarios with incrementally increasing search area sizes.

FIG. 5 illustrates an example in which the gesture interaction would be ambiguous if the touch zone 520 was the size of a finger because it would overlap both object 310 and object 312. In this example, the user intends to select object 310. Notice that touch zone 520 is between triangular object 310 and round object 312. In this example, the correct object 310 may be identified using the initial (smallest) touch zone search area size since search area 520 overlaps only object 310.

Figure 6:
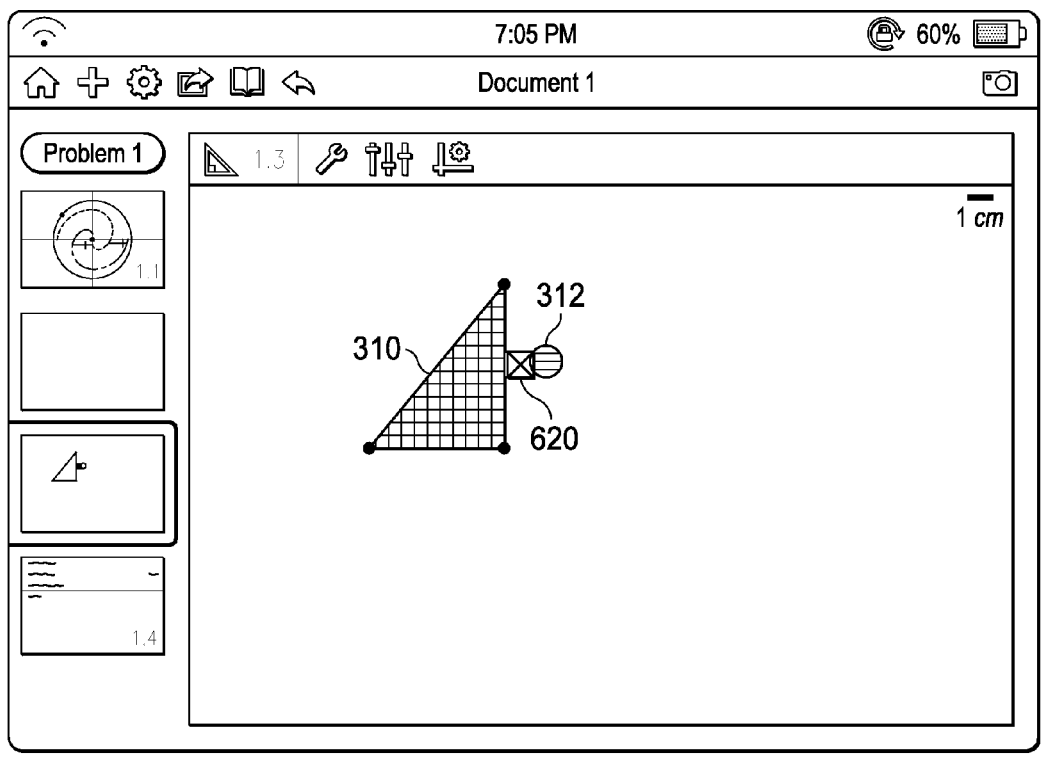

FIG. 6 illustrates an example in which the user intends to select object 312. In this example, gesture interaction 620 would be ambiguous if the touch zone was the size of a finger because it would overlap both object 310 and object 312. In this example, the correct object 312 may be identified using the next larger (from initial) touch zone search area size 431, referring back to FIG. 4, since search area 620 overlaps object 312 and not object 310. Note that the initial smallest search area size 431 would not overlap either object 310 or object 312 so neither would be initially selected on the first search iteration.

Figure 7:
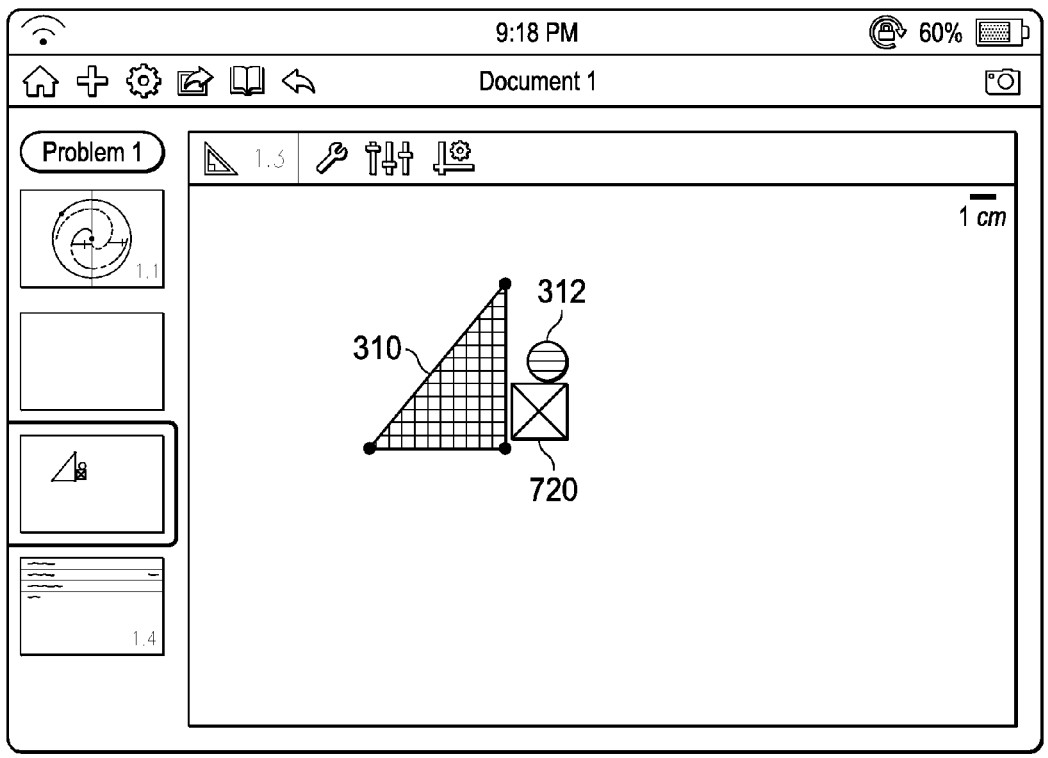

FIG. 7 illustrates an example in which the gesture interaction 720 occurred at a location that does not coincide with any of the objects. In this example, the object selection software may iterate through all of the touch zone search sizes and still not detect an overlap with an object. In this figure, the largest touch zone search area 432 is shown. In this case, after iterating through all touch zone search area sizes the object search is terminated.

Figure 8:
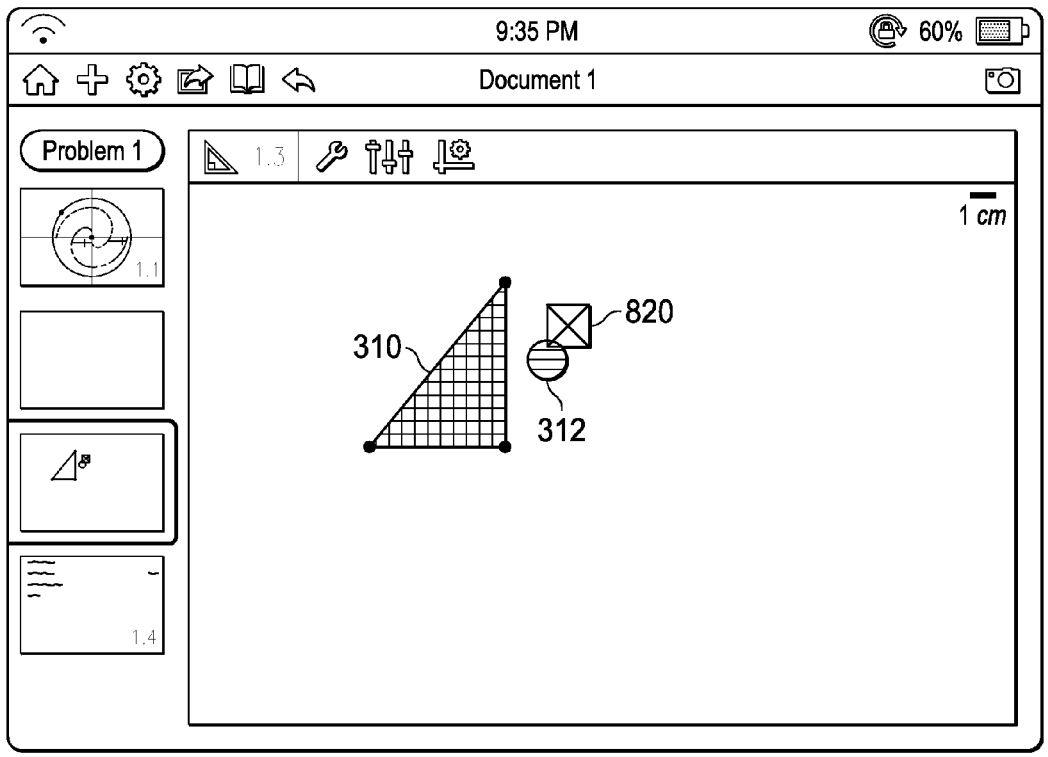

FIG. 8 illustrates an example in which the user intends to select object 312 and touch interaction area 820 is detected. In this example, non-ambiguous object manipulation may be performed after iterating to the largest search area size 432, since the largest search area size 432 overlaps only object 312.

Figure 9:
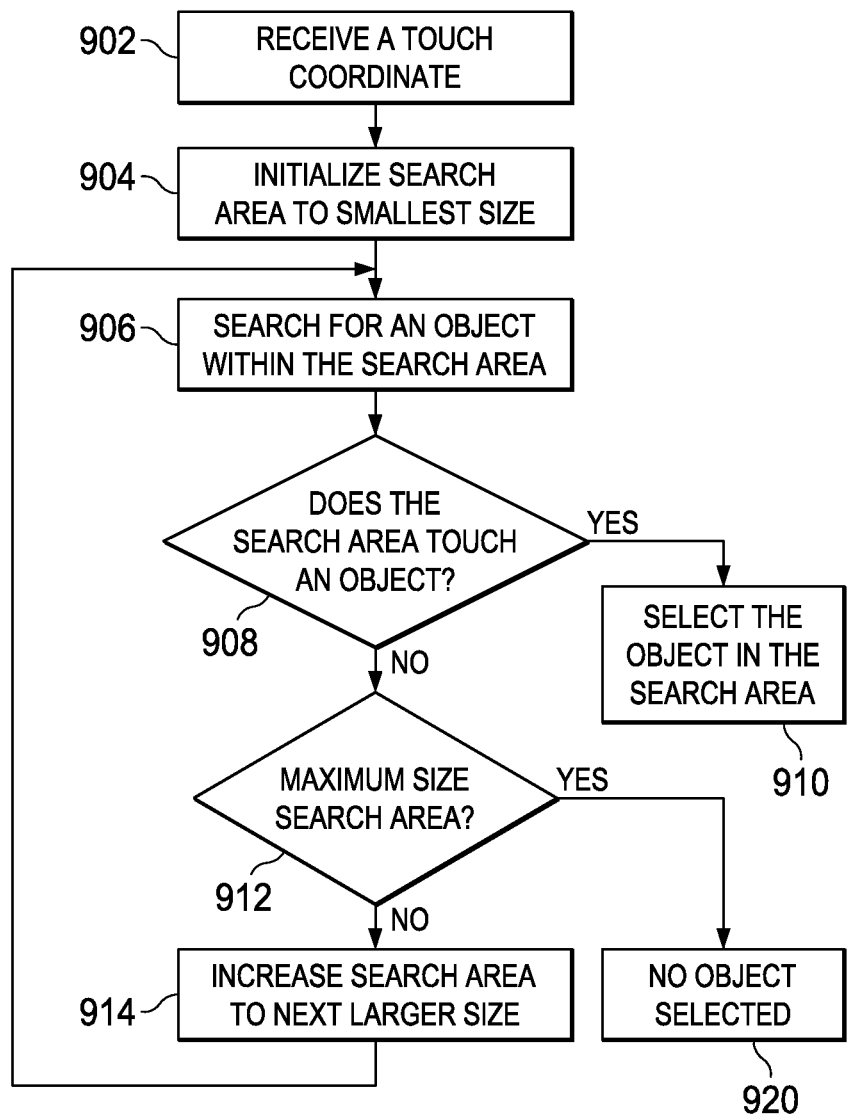
FIG. 9 is a flow diagram illustrating operation of precise object selection in a touch sensing system.

FIG. 9 is a flow diagram illustrating operation of precise object selection in a touch sensing system, such as the system illustrated in FIGS. 1-2, using multiple size search areas such as illustrated in FIG. 3.

When a touch event is detected, touch detection logic in the system sends a set of touch coordinates that specify a touch location that is received 902 by object detection logic in the system. The object detection logic initializes 904 a search area to be a smallest size.

The object detection logic then searches 906 for an object within the smallest size search area. Techniques for searching for an object within a search area and reporting a selected object for use by application software are well known and need not be described in further detail herein. If an object is found 908 within the search area, then the object is selected 910 and identified for use by application software in the system.

If no object is found 908 within the search area, then a check is made 912 to determine if the maximum size search area has been used. If the maximum size search area has been used and no objects were selected, then the search logic reports that no objects were selected 920 and the object search is terminated.

However, if the maximum size search area has not yet been used 912, then the size of the search area is increased 914 to the next larger size and the search for an object 906 is repeated.

In this manner, the size of the search area is initially set to a small area to allow precision selection of objects that are located in close proximity. If no object is found, then the size of the search area is incrementally increased in order to cover a larger search area until a maximum search area size is reached.

In some cases, two or more objects may be included in the search area, even when it is at the minimum size. In this case, a menu may be provided to allow a user to select from among the multiple objects. This technique is described in more detail in U.S. patent application Ser. No. 13/940,502, Method, System and Computer Program Product for Operating a Touchscreen, filed Jul. 12, 2013, which is incorporated by reference herein.

Other Embodiments

While the invention has been described with reference to illustrative embodiments, this description is not intended to be construed in a limiting sense. Various other embodiments of the invention will be apparent to persons skilled in the art upon reference to this description. For example, other embodiments may use more than three iterations of the search area. In this example, each search area is twice as large as the prior search area; other embodiments may use different size ratios between each increasing larger search area, for example. In the example described herein, the touch coordinate is considered to be in the center of the search areas; in other embodiments, the touch coordinate may be offset from the center, for example.

Embodiments of the concepts described herein are not meant to be limited to calculator systems and may be applied to any touch sensitive input device. Embodiments may be provided, for example, for tablets, digital reading devices, mobile phones, desktop computers, portable computers, vehicle displays, and special-purpose appliances with touch keyboards, for example.

The techniques described in this disclosure may be implemented in hardware, software, firmware, or any combination thereof. If implemented in software, the software may be executed in one or more processors, such as a microprocessor, application specific integrated circuit (ASIC), field programmable gate array (FPGA), or digital signal processor (DSP). The software that executes the techniques may be initially stored in a computer-readable medium such as compact disc (CD), a diskette, a tape, a file, memory, or any other computer readable storage device and loaded and executed in the processor. In some cases, the software may also be sold in a computer program product, which includes the computer-readable medium and packaging materials for the computer-readable medium. In some cases, the software instructions may be distributed via removable computer readable media (e.g., floppy disk, optical disk, flash memory, USB key), via a transmission path from computer readable media on another digital system, etc.

Although method steps may be presented and described herein in a sequential fashion, one or more of the steps shown and described may be omitted, repeated, performed concurrently, and/or performed in a different order than the order shown in the figures and/or described herein. Accordingly, embodiments of the invention should not be considered limited to the specific ordering of steps shown in the figures and/or described herein.

It is therefore contemplated that the appended claims will cover any such modifications of the embodiments as fall within the true scope and spirit of the invention.

What is claimed is:

1. A method for selecting an object on a display screen, the method comprising:
  receiving a touch coordinate indicative of a touch location on the display screen, wherein the touch coordinate is positioned at a location outside of an outer boundary of a first object displayed on the display screen and outside of an outer boundary of a second object displayed on the display screen;

establishing an initial search area relative to and including the touch coordinate, wherein the initial search area has an initial area size;

responsive to determining that neither the first object nor the second object is within the first search area, incrementally increasing area size of the initial search area to an increased area until the increased area overlaps one of either the first object or the second object; and selecting either the first object or the second object in response to whichever of the first object or the second object is first overlapped by the incrementally increasing step.

2. The method of claim 1, wherein the initial area size is a square with each side approximately 1/12 inch long.

3. The method of claim 1, wherein the establishing step comprises establishing the initial search area with the touch coordinate centered in the initial search area.

4. The method of claim 1, and further comprising, responsive to detecting that both the first object and the second object are overlapped by the incrementally increasing step:

displaying a user query for indicating a selection of either the first object or the second object; and selecting either the first object or the second object in response to a user response to the user query.

5. A system comprising:

a touch sensitive display screen;

an instruction processor coupled to a memory, wherein the instruction processor is controllably coupled to the touch sensitive screen, wherein the instruction processor is operable to execute instructions that cause a method for operating a user interface on the touch sensitive display screen to be performed, the method comprising:

displaying objects on the display screen;

receiving a touch coordinate indicative of a touch location on the display screen, wherein the touch coordinate is positioned at a location outside of an outer boundary of a first object displayed on the display screen and outside of an outer boundary of a second object displayed on the display screen;

establishing an initial search area relative to and including the touch coordinate, wherein the initial search area has an initial area size;

responsive to determining that neither the first object nor the second object is within the first search area, incrementally increasing area size of the initial search area to an increased area until the increased area overlaps one of either the first object or the second object selecting either the first object or the second object in response to whichever of the first object or the second object is first overlapped by the incrementally increasing step.

6. The system of claim 5, wherein the initial area size is a square with each side approximately 1/12 inch long.

7. The system of claim 5, wherein the establishing step comprises establishing the initial search area with the touch coordinate centered in the initial search area.

8. The system of claim 5, the method further comprising, responsive to detecting that both the first object and the second object are overlapped by the incrementally increasing step:

displaying a user query for indicating a selection of either the first object or the second object; and selecting either the first object or the second object in response to a user response to the user query.

9. A non-transitory computer-readable medium storing software instructions that, when executed by a processor, cause a method for operating a user interface on a system to be performed, the method comprising:

displaying objects on a display screen;

receiving a touch coordinate indicative of a touch location on the display screen, wherein the touch coordinate is positioned at a location outside of an outer boundary of a first object displayed on the display screen and outside of an outer boundary of a second object displayed on the display screen;

establishing an initial search area relative to and including the touch coordinate, wherein the initial search area has an initial area size;

responsive to determining that neither the first object nor the second object is within the first search area, incrementally increasing area size of the initial search area to an increased area until the increased area overlaps one of either the first object or the second object;

selecting either the first object or the second object in response to whichever of the first object or the second object is first overlapped by the incrementally increasing step.

10. The non-transitory computer-readable medium of claim 9, wherein the initial area size is a square with each side approximately 1/12 inch long.

11. The non-transitory computer-readable medium of claim 9, wherein the establishing step comprises establishing the initial search area with the touch coordinate centered in the initial search area.

12. The non-transitory computer-readable medium of claim 9, the method further comprising, responsive to detecting that both the first object and the second object are overlapped by the incrementally increasing step:

displaying a user query for indicating a selection of either the first object or the second object; and selecting either the first object or the second object in response to a user response to the user query.

13. The method of claim 1 and further comprising, responsive to determining that neither the first object nor the second object is reached after plural repetitions of the incrementally increasing step, terminating further increments with respect to the touch coordinate.

14. The method of claim 13 wherein the terminating step occurs further in response to a final repetitions of the incrementally increasing step using a search area of a square with each side approximately 1/3 inch long.

15. The system of claim 5, wherein the method further comprises, responsive to determining that neither the first object nor the second object is reached after plural repetitions of the incrementally increasing step, terminating further increments with respect to the touch coordinate.

16. The system of claim 15 wherein the terminating step occurs further in response to a final repetitions of the incrementally increasing step using a search area of a square with each side approximately 1/3 inch long.

17. The non-transitory computer-readable medium of claim 9, wherein the method further comprises, responsive to determining that neither the first object nor the second object is reached after plural repetitions of the incrementally increasing step, terminating further increments with respect to the touch coordinate.

18. The non-transitory computer-readable medium of claim 17 wherein the terminating step occurs further in response to a final repetitions of the incrementally increasing step using a search area of a square with each side approximately 1/3 inch long.

* * * * *